(12) United States Patent
Pfeiffer et al.

(10) Patent No.: US 11,272,077 B2
(45) Date of Patent: Mar. 8, 2022

(54) COLOR CONTROL IN A PRINTING PRESS BY ADAPTING THE PRINT IMAGE DATA IN THE DEVICE-INDEPENDENT COLOR SPACE TO DEVIATING MEASUREMENT CONDITIONS OF THE OUTPUT PROFILE USING UV LIGHT EXCITATION

(71) Applicant: HEIDELBERGER DRUCKMASCHINEN AG, Heidelberg (DE)

(72) Inventors: Nikolaus Pfeiffer, Heidelberg (DE); Stefan Bollmann, Hamburg (DE); Hauke Thomsen, Heikendorf (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 217 days.

(21) Appl. No.: 16/655,546

(22) Filed: Oct. 17, 2019

(65) Prior Publication Data

US 2020/0137264 A1 Apr. 30, 2020

(30) Foreign Application Priority Data

Oct. 31, 2018 (DE) ...................... 10 2018 218 656.1

(51) Int. Cl.
*H04N 1/60* (2006.01)
*H04N 1/00* (2006.01)

(52) U.S. Cl.
CPC ......... *H04N 1/603* (2013.01); *H04N 1/00323* (2013.01); *H04N 1/6086* (2013.01); *H04N 1/6088* (2013.01)

(58) Field of Classification Search
CPC combination set(s) only.
See application file for complete search history.

(56) References Cited

U.S. PATENT DOCUMENTS

| | | | |
|---|---|---|---|
| 8,031,203 | B2 | 10/2011 | Kawashima et al. |
| 9,741,132 | B2 | 8/2017 | Krabbenhoeft |
| 9,819,837 | B2 | 11/2017 | Sulistio et al. |
| 10,397,413 | B2 | 8/2019 | Eggert et al. |

(Continued)

FOREIGN PATENT DOCUMENTS

| | | |
|---|---|---|
| CN | 102171051 A | 8/2011 |
| CN | 103369169 A | 10/2013 |

(Continued)

*Primary Examiner* — Christopher Wait
(74) *Attorney, Agent, or Firm* — Laurence A. Greenberg; Werner H. Stemer; Ralph E. Locher

(57) ABSTRACT

A method performs color control in a printing operation on a printing machine by use of a computer. The computer uses an input profile to transform print image data from a first color space to a device-independent color space, subsequently uses an output profile to transform the print image data into a second color space dependent on the printing machine. The computer compares measurement conditions of the used input profile and of the output profile to be generated, and, if there are differences between the respective measurement conditions, adapts the print image data in the device-independent color space to deviating measurement conditions of the output profile. The printing machine subsequently executes the printing operation using the print image data, and wherein UV light excitation is used for the measurement conditions of the output profile.

7 Claims, 2 Drawing Sheets

(56) References Cited

U.S. PATENT DOCUMENTS

| | | |
|---|---|---|
| 2007/0058186 A1 | 3/2007 | Tanaka |
| 2008/0144141 A1 | 6/2008 | Tai et al. |
| 2011/0221800 A1 | 9/2011 | Ikeda |
| 2012/0176631 A1 | 7/2012 | Walp et al. |
| 2013/0258365 A1 | 10/2013 | Shimizu |
| 2019/0260912 A1* | 8/2019 | Matsushima .......... H04N 1/603 |

FOREIGN PATENT DOCUMENTS

| | | |
|---|---|---|
| CN | 106004037 A | 10/2016 |
| CN | 106004037 B | 9/2017 |
| CN | 108621567 A | 10/2018 |
| DE | 3707027 A1 | 9/1988 |
| DE | 10016566 A1 | 10/2001 |
| JP | 2007081586 A | 3/2007 |
| JP | 2012015595 A | 1/2012 |
| JP | 2013120946 A | 6/2013 |
| JP | 2017038273 A | 2/2017 |

* cited by examiner

COLOR CONTROL IN A PRINTING PRESS BY ADAPTING THE PRINT IMAGE DATA IN THE DEVICE-INDEPENDENT COLOR SPACE TO DEVIATING MEASUREMENT CONDITIONS OF THE OUTPUT PROFILE USING UV LIGHT EXCITATION

CROSS-REFERENCE TO RELATED APPLICATION

This application claims the priority, under 35 U.S.C. § 119, of German application DE 10 2018 218 656.1, filed Oct. 31, 2018; the prior application is herewith incorporated by reference in its entirety.

BACKGROUND OF THE INVENTION

Field of the Invention

The invention deals with a method for correcting measurement conditions in a color transformation for a printing operation on a digital printing machine.

The technical field of the invention is the field of digital printing.

Similar to regular lithographic offset printing, digital printing requires the use of dedicated characterization data for every printing machine that is used. For a specific printing machine, these characterization data describe the relationship between a device-independent color space such as the LAB color space and the device-specific process color space, in general CMYK or, in the case of inkjet printing, CMYK plus a number of additional process colors such as OGV. This means that for this specific printing machine, the characterization data describe the process color combination that is required to obtain a specific LAB value. The preferred format for characterization data is an International Color Consortium (ICC) profile. When a printing operation is carried out, what is known as an input ICC profile is used to convert the data from the color space of the pre-print stage into the machine-independent color space such as LAB. Then the ICC profile is used to convert the printing data from the LAB color space to the machine-specific process color space in order to be able to print on the machine in question. Printing data that have been converted in this way may be used by the digital printing machine.

The input and output ICC profiles that have been used, however, are created in accordance with a specific standard under specific measurement conditions. If the measurement conditions that were used to create the input and output profiles vary, this may have undesired effects on the color transformation of the printing data. The background is that with the introduction of the new ISO 12 647/2 color standard, a new measurement condition was introduced. The M1 measurement condition differs from the older M0 or M2 measurement conditions in that it contains an UV excitation whereas M0 or M2 use only little UV excitation or none at all. When they are applied to create corresponding ICC profiles, the new M1 measurement conditions have a number of advantages, in particular that they result in a better match between proof and print in the case of optically brightened materials. Therefore, the prior art now favors the use of M1-based ICC profiles on digital/inkjet printing machines. However, ICC profiles that are based on M0 measurement conditions such as Fogra 39 are still very common. In particular, M0-based color profiles such as Fogra 39 continue to be frequently used as an input ICC profile. Now if an M0-based ICC input profile is combined with an M1-based ICC output profile, computer-assisted color control usually treats the input values like M1 values. The use of the printing data created by means of the M1 output profile in the printing operation results in an off-color hue of the print. Since this is an undesired effect, operator intervention is required. Such a manual intervention is a complex process and is only possible if the device link profile of the ICC profile is known. In addition, prior art device link profiles that are used today frequently factor in side conditions that are either unnecessary or limiting and are highly complex in terms of computation.

No further approaches to solve this problem are known in the art. It is true that U.S. Pat. No. 8,031,203 B2 discloses to convert print image data from a first input color space of a pre-print stage, for instance RGB, into the machine-independent LAB color space, in which they are adapted, and subsequently to convert them into the CMYK machine color space, i.e. the process color space, yet the adaptation of the print image data is in no way dependent on the measurement conditions of the creation of the ICC profiles. The adaptations made in this prior art method only concern gamut compression and do not take the corresponding measurement conditions of the ICC profiles that are used into any further consideration.

SUMMARY OF THE INVENTION

Thus an object of the present invention is to provide a color space transformation method for digital printing machines wherein ICC profiles that have been created under different measurement conditions may be used without any printing quality deterioration.

The object is attained by a method for color control in a printing operation on a printing machine by means of a computer. The computer uses an input profile to transform print image data from a first color space to a device-independent color space, subsequently uses an output profile to transform the print image data into a second color space dependent on the printing machine, compares measurement conditions of the used input profile and of the output profile to be generated, and, if there are differences between the respective measurement conditions, adapts the print image data in the device-independent color space to deviating measurement conditions of the output profile. The core aspect of the method of the invention is to compare the actual measurement conditions of the corresponding input profile and of the applied output profile in an automated way at the beginning to find differences. Once the differences have been identified, the computer may adapt the print image data as a function of the differences to ensure that when the output profile is used in the printing operation, no deviations at all occur in the desired printed image despite the different measurement conditions that existed when the two profiles were created. This in particular refers to the undesired effect of an off-color hue.

Advantageous and thus preferred further developments of the method will become apparent from the associated dependent claims and from the description together with the associated drawings.

A preferred further development of the method of the invention in this context is that ICC profiles are used as input and output profiles. The method of the invention relates to all types of characterization data. However, by far the most common ones are ICC profiles, which are consequently the preferred profiles for the method of the invention to be applied to.

A further preferred further development of the method of the invention in this context is that if the measurement conditions differ, to adapt the print image data, the computer converts the input profile to match the measurement conditions of the output profile when the output profile is created. This way to proceed makes the most sense in particular because the input profile is usually the profile based on obsolete M0 measurement conditions whereas the output profile that is used for conversion to the actual process color space was created under the newer M1 measurement conditions.

A further preferred further development of the method of the invention in this context is that the computer generates a respective output profile for every different measurement condition on the basis of the converted input profile. There are various measurement conditions that are of relevance to the output profile in particular, among them the substrate that is used, the type of halftone, etc. However, only one optimized output profile is to be generated for every measurement condition that differs between input and output profile because otherwise the conversion would become too complex.

A further preferred further development of the method of the invention in this context is that when the input profile is known, the computer looks up the measurement conditions that were used to create the input profile in a table and uses these known measurement conditions to make the conversion if measurement conditions differ. There are basically two options for the comparison between the respective measurement conditions of the input and output profiles. The first option refers to a case in which the computer that makes the computation has information on the input profile and on the measurement conditions that were present when the profile was created. These measurement conditions that were present when the input profile was created are saved in a table from which they may be retrieved by the computer. The measurement conditions used to create the output profile will always be known because the output profile is used for the actual conversion of the print image data from the machine-independent color space to the machine-specific process color space. If the output profile including the relevant measurement conditions was unknown, no printing operation could be carried out. It is the input profile that will not always be known, for it is possible for the computer to receive the print image data already in a machine-independent color space. In such a case, the computer does not have access to information on the input profile that was used to convert the print image data into the machine-independent color space.

A further preferred further development of the method of the invention in this context is that the table is saved in a database to which the computer has access. To ensure that computer is actually able to use the table containing the measurement conditions of the input profile, the table needs to be saved in a suitable database. Since in many cases it is not the computer described herein that uses the input profile to convert the print image data into the machine-independent color space, the database will hardly ever be saved on hardware that is actually physically present on the computer, but preferably on a server or pre-print computer that is accessible via a network.

A further preferred further development of a method of the invention in this context is that the computer makes the conversion by use of a device link profile between input and output profile, adapting the device link profile to the deviating measurement conditions in the process. If the measurement conditions of the input profile are known, as it makes the conversion by use of a device link profile in a corresponding way, the computer may adapt the device link profile to deviating measurement conditions. Moreover, in such a case it is not necessary to factor in the aforementioned undesired side conditions that have been taken into consideration in the device link profile.

A further preferred further development of the method of the invention in this context is that when the input profile is unknown, the computer makes an estimate of the respective measurement conditions of the input profile on the basis of the paper class and lab value of the paper white that have been used and uses the measurement conditions estimate to make the conversion if measurement conditions differ. In contrast, the second option refers to a case in which the computer has no information on the input profile. In such a case the computer has no information on the measurement conditions. There is no table for the computer to look them up in. In such a case, the computer needs to make estimates on the measurement conditions. Conclusions on the measurement conditions may be drawn from the paper class that was used and from the Lab value of paper white. Then the conversion may be made in a corresponding way using the estimates of the input profile measurement conditions.

A further preferred further development of the method of the invention in this context is that the computer makes the conversion by means of an estimate of a white dot shift caused by the different measurement conditions and by means on an inverse white dot correction of the input profile. To make the conversion in the second case involving an unknown input profile, the computer makes an estimate of the white dot shift caused by the corresponding different measurement condition, in particular in terms of the paper class and Lab values of paper white, and makes an inverse white dot correction for the corresponding print image data. The print image data adaptation made in this way is obviously not as efficient as it could be if the measurement conditions of the input profile were known. However, it still results in considerable improvements in terms of the problems that occur in the case of different measurement conditions such as a resultant off-color hue. This is considerable progress compared to the prior art where an operator needs to make manual adaptations if the input profile is known and where no adaptation is possible at all if the input profile is not known.

A further preferred further development of the method of the invention in this context is that an UV light excitation is used for the measurement conditions of the output profile. As mentioned in the introduction, the main difference in terms of the measurement conditions between the output profile and the input profile is that the output profile factors in UV light excitation whereas this was not done in a corresponding way for the measurement conditions used to create the input profile.

The invention as such as well as further developments of the invention that are advantageous in constructional and/or functional terms will be described in more detail below with reference to the associated drawings and based on at least one preferred exemplary embodiment. In the drawings, mutually corresponding elements have the same reference symbols.

Other features which are considered as characteristic for the invention are set forth in the appended claims.

Although the invention is illustrated and described herein as embodied in a correction of measurement conditions in digital printing machines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
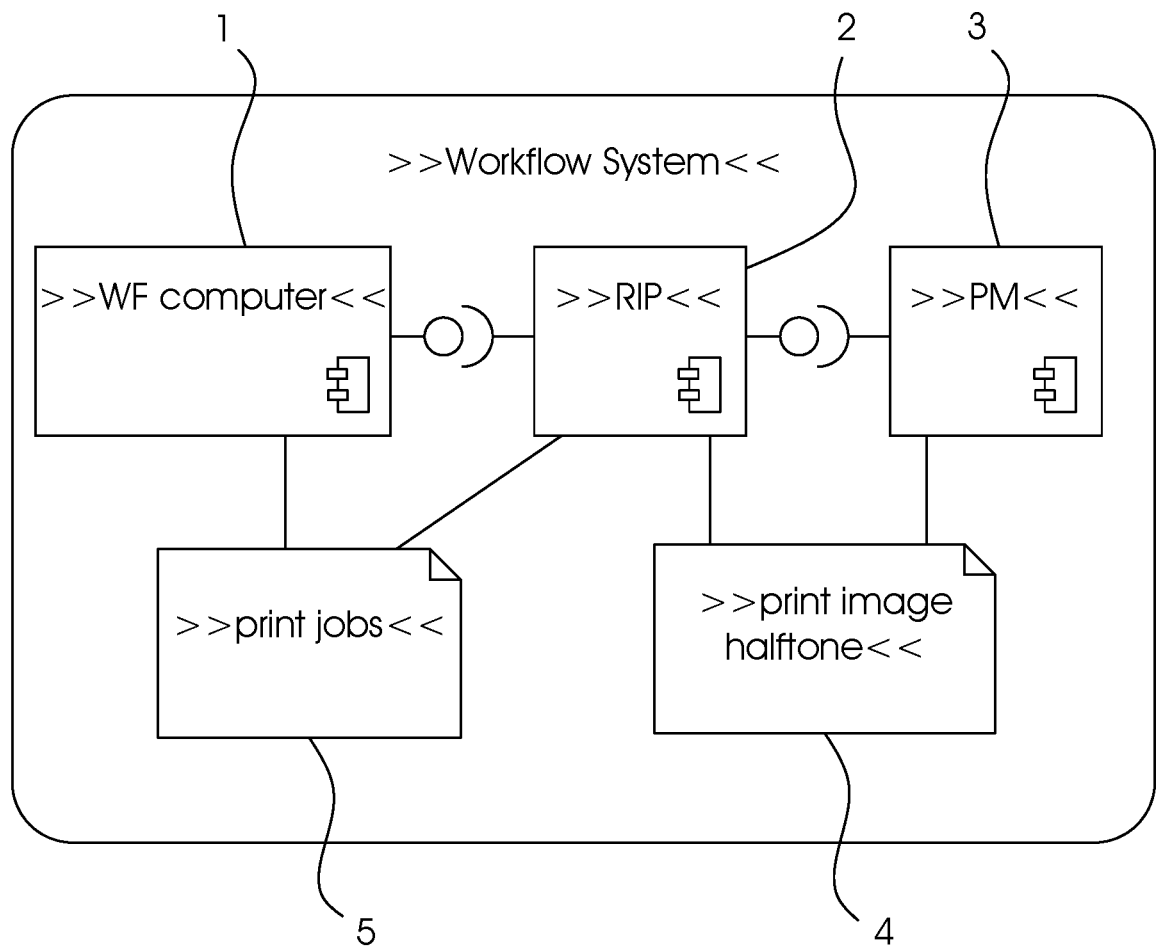
FIG. 1 is an illustration showing an example of a workflow system for implementing a method of the invention.

Referring now to the figures of the drawings in detail and first, particularly to FIG. 1 thereof, there is shown a method of the invention being implemented on an inkjet printing machine 3 that is included in a specific workflow system. An example of such a workflow system is shown in FIG. 1. The workflow system runs on one or more computers 1 for processing corresponding print jobs 5. A print job 5, which is to be carried out on an inkjet printing machine 3, is subjected to a halftoning process in a raster image processor 2, which then forwards the print image halftones 4 to the inkjet printing machine 3 for a corresponding production run.

Figure 2:
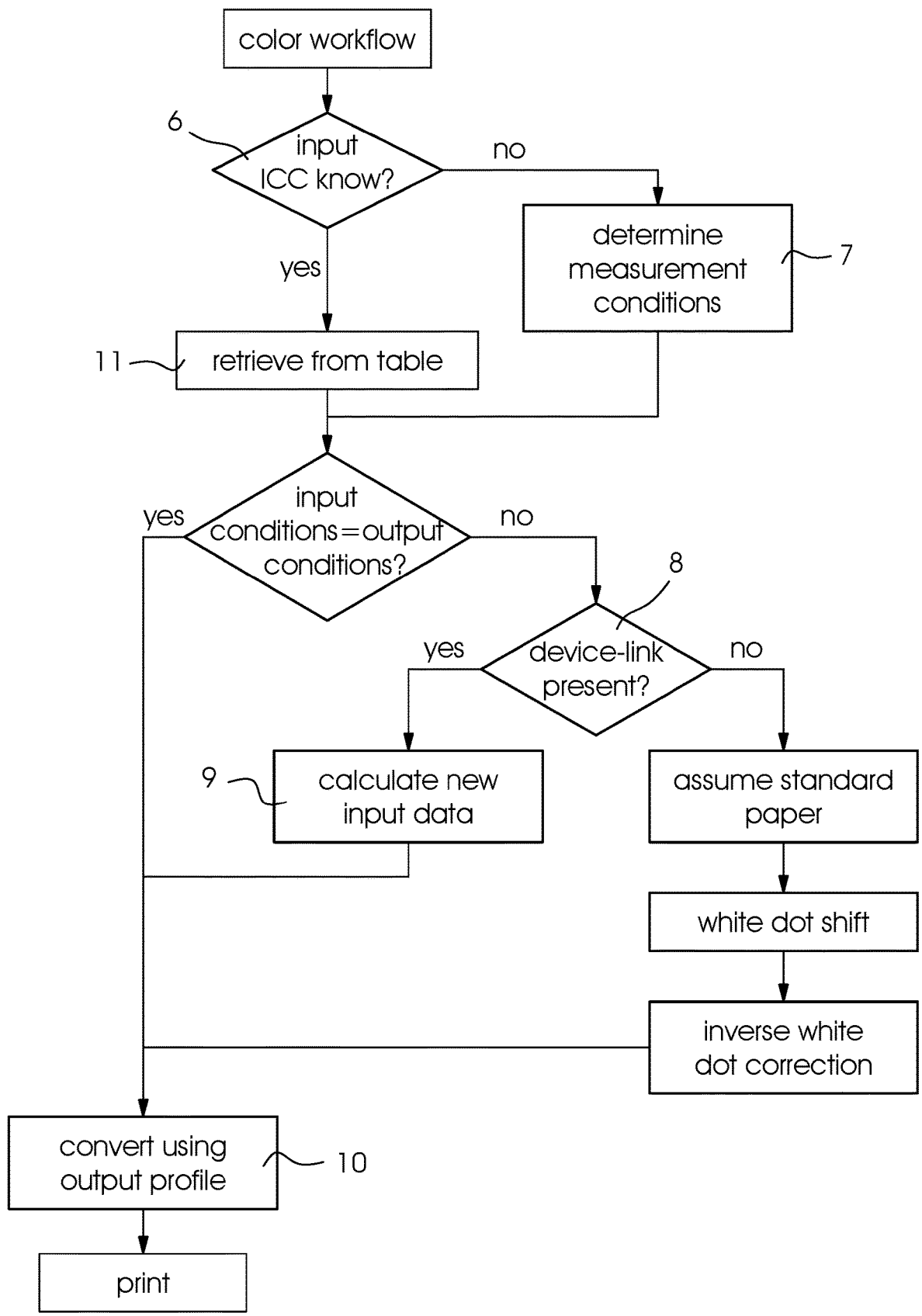
FIG. 2 is a schematic flowchart of the method of the invention.

FIG. 2 is a schematic flow chart of a preferred embodiment of the method of the invention. In accordance with the color workflow shown in FIG. 2, the first step is to find out whether or not the computer knows which input ICC profile 6 was used. This means that the computer 1 analyzes an input image data 9. Now there are two options:

1. The input profile 6 is a known ICC input profile 6 such as an ECI or Fogra profile. In such a case, the computer 1 accesses a table 11 to retrieve the measurement conditions 7 that were used. The table 11 is provided in a database that the computer 1 may access via a network.

2. The input profile 6 is an unknown ICC input profile 6. In such a case, the computer 1 needs to make an estimate of the measurement conditions 7 with the aid of the paper class of the printing substrate that was used and with the aid of the Lab value of paper white.

Once the measurement conditions 7 have been defined, i.e. estimated, the computer 1 compares the measurement conditions 7 of the input profile 6 and of the output profile 10 to find out whether they are identical. If they are, the next steps are to convert the print image data 9 from the machine-independent color space, usually the Lab color space, to the machine-specific color space, usually CMYK, and to carry out the printing operation using the print image data 9 that have been subjected to a color transformation process in the corresponding way. For the method of the invention, the most relevant case is the second one in which the measurement conditions 7 of the input ICC profile 6 differ from those of the output ICC profile 10. Therefore, the next step of the method varies as a function of whether the ICC input profile 6 is known or not.

1. If the input ICC profile 6, for instance a Fogra39/51 profile, is known, there will also be a profile of the desired measurement conditions 7. Thus the computer 1 may use a device link profile 8 that is provided to make the conversion from the input ICC profile 6 to the output ICC profile 10 without any undesired side conditions.

2. If the ICC input profile 6 is unknown, the computer 1 makes an estimate of the white dot shift caused by the different measurement conditions 7 and an inverse white dot correction of the input image data 9.

Once the measurement conditions 7 have been factored in this way and the color space transformation into the process color space of the inkjet printing machine 3 has been corrected in a corresponding way, the printing operation may be carried out. Any undesired effects such as the undesired off-color hue may thus be reduced to a considerable extent or even eliminated.

In a nutshell, the method of the invention has the following features:

1. Automated check whether the measurement conditions 7 are the same:
  a. based on a table 11 of known profiles 6, 10, and
  b. based on paper white and paper class.
2. Automated adaptation of the input image data to match the output measurement conditions:
  a. based on device link profile 8, and
  b. based on inverse white dot correction.
3. "New" device link profiles 8 without any undesired side conditions.

Compared to the prior art, the method of the invention has the following advantages: the avoidance of off-color hues even when ICC profiles 6, 10 created under different measurement conditions 7 are used, an automated computer-based analysis of input and output profiles 6, 10 to find out whether they are based on identical measurement conditions 7 and, if required, an automated conversion of the input image data 9 to match the output measurement conditions 7. Manual operator inventions are no longer required. The color output is correct even if measurement conditions 7 differ, and only one output profile 10 needs to be created.

LIST OF REFERENCE NUMERALS 1 computer
2 raster image processor (RIP)
3 inkjet printing machine
4 halftone image
5 print job
6 ICC input profile
7 measurement conditions
8 device link profile
9 adapted input image data
10 ICC output profile
11 stored table containing measurement conditions

The invention claimed is:

1. A method for performing color control in a printing operation on a printing machine by means of a computer, which further comprises:
  providing the computer an input profile and the computer uses the input profile to transform print image data from a first color space to a device-independent color space, subsequently the computer uses an output profile to transform the print image data into a second color space dependent on the printing machine;
  comparing measurement conditions of the input profile used and of the output profile to be generated, and, if there are differences between the measurement conditions, adapting the print image data in the device-independent color space to deviating measurement conditions of the output profile;

subsequently executing, via the printing machine, the printing operation using the print image data; and using UV light excitation for the measurement conditions of the output profile.

2. The method according to claim 1, which further comprises using International Color Consortium profiles for the input profile and the output profile.

3. The method according to claim 1, wherein if the measurement conditions differ, to adapt the print image data, the computer performs a conversion where the computer converts the input profile to match the measurement conditions of the output profile when the output profile is created.

4. The method according to claim 3, which further comprises creating, via the computer, a respective output profile for every different measurement condition on a basis of a converted input profile.

5. The method according to claim 3, wherein if the input profile is known, the computer looks up the measurement conditions that were used to create the input profile in a table and uses known measurement conditions to make the conversion if the measurement conditions differ.

6. The method according to claim 5, which further comprises saving the table in a database to which the computer has access.

7. The method according to claim 5, wherein the computer makes the conversion by means of a device link profile between the input profile and the output profile, and adapting the device link profile to deviating measurement conditions in the method.

* * * * *